United States Patent
Asher et al.

(10) Patent No.: US 10,338,855 B2
(45) Date of Patent: Jul. 2, 2019

(54) OPTIMIZED READING OF MULTIPLE OBJECTS FROM TAPE

(71) Applicant: International Business Machines Corporation, Armonk, NY (US)

(72) Inventors: Kai A. G. Asher, Tucson, AZ (US); Jason D. Hagar, Tucson, AZ (US); Yu Meng Li, Beijing (CN)

(73) Assignee: International Business Machines Corporation, Armonk, NY (US)

(*) Notice: Subject to any disclaimer, the term of this patent is extended or adjusted under 35 U.S.C. 154(b) by 53 days.

(21) Appl. No.: 15/373,412

(22) Filed: Dec. 8, 2016

(65) Prior Publication Data

US 2018/0165019 A1    Jun. 14, 2018

(51) Int. Cl.
*G06F 3/06* (2006.01)

(52) U.S. Cl.
CPC ............ *G06F 3/0682* (2013.01); *G06F 3/061* (2013.01); *G06F 3/0656* (2013.01)

(58) Field of Classification Search
CPC ............... G06F 3/00; G06F 3/06–0619; G06F 3/062–065; G06F 3/0652–067; G06F 3/0671; G06F 3/0682; G06F 3/0683–0689; G06F 11/00–11/3696; G06F 12/00–16; G06F 13/00–4295; G06F 17/30–30994; G06F 2003/0691–0698; G06F 2101/00–16; G06F 2206/00–20; G06F 2207/00–7295; G06F 2211/00–902; G06F 2212/00–7211; G06F 2213/00–4004; G06F 2216/00–17
See application file for complete search history.

(56) References Cited

U.S. PATENT DOCUMENTS

| 4,689,767 A * | 8/1987 | Stevenson | ............. | G06F 3/0601 360/31 |
| 5,901,331 A * | 5/1999 | Schlegel | ............. | G06F 11/1464 710/22 |

(Continued)

OTHER PUBLICATIONS

SMPTE Periodical—Extending Video Content Survival beyond 25 Years—When All Odds Seem Stacked against it; Zwaneveld, E. H.; SMPTE Journal, vol. 108, iss. 10, pp. 713-717; Oct. 1999 (Year: 1999).*

(Continued)

*Primary Examiner* — Daniel C. Chappell
(74) *Attorney, Agent, or Firm* — Nelson and Nelson; Daniel P. Nelson; Alexis V. Nelson

(57) ABSTRACT

A method for restoring multiple objects from tape (1) generates a list of objects to be restored from tape; (2) identifies a starting location of a first object on the tape; and reads, into a buffer from the tape, an entire buffer of data from the starting location. The method then (4) determines a length of the first object; (5) restores the first object; and (6) finds a start of a next object in the buffer using a length of the previous object. The method (7) determines a length of the next object by analyzing metadata of the next object and (8) restores the next object if the next object is in the list. The method (9) repeats steps (6), (7), and (8) until the end of the buffer is reached or all objects in the list have been restored. A corresponding system and computer program product are also disclosed.

20 Claims, 7 Drawing Sheets

(56) References Cited

U.S. PATENT DOCUMENTS

| | | | | |
|---|---|---|---|---|
| 6,038,379 | A * | 3/2000 | Fletcher | G06F 11/1456 707/999.01 |
| 6,145,034 | A * | 11/2000 | Bar | G06F 3/0607 360/70 |
| 6,282,040 | B1 * | 8/2001 | Bartlett | G06F 3/0614 360/31 |
| 6,446,175 | B1 * | 9/2002 | West | G06F 11/1456 711/161 |
| 6,779,001 | B1 * | 8/2004 | Kanai | G06F 9/466 |
| 8,099,572 | B1 | 1/2012 | Arora et al. | |
| 8,935,470 | B1 * | 1/2015 | Fair | G06F 3/0682 711/112 |
| 9,329,787 | B2 * | 5/2016 | Katagiri | G06F 3/0613 |
| 2003/0190137 | A1 * | 10/2003 | Pesce | H04N 5/765 386/231 |
| 2008/0046670 | A1 * | 2/2008 | Lam | G06F 11/1456 711/161 |
| 2010/0280651 | A1 * | 11/2010 | Edling | G11B 23/042 700/214 |
| 2011/0219190 | A1 * | 9/2011 | Ng | G06F 12/0862 711/122 |
| 2011/0238716 | A1 * | 9/2011 | Amir | G06F 3/0611 707/823 |
| 2011/0238906 | A1 * | 9/2011 | Amir | G06F 3/0611 711/111 |
| 2011/0282845 | A1 * | 11/2011 | Kushwah | G06F 11/1469 707/679 |
| 2012/0324205 | A1 * | 12/2012 | Teo | G06F 12/0246 711/212 |
| 2014/0006353 | A1 * | 1/2014 | Chen | G06F 17/30227 707/648 |
| 2014/0215145 | A1 * | 7/2014 | Ballard | G06F 3/0682 711/111 |
| 2015/0378834 | A1 * | 12/2015 | Bachu | G06F 11/1448 707/646 |

OTHER PUBLICATIONS

Media Storage in the Cloud; Patel et al.; SMPTE17: Embracing Connective Media; Jul. 18-20, 2017 (Year: 2017).*

Managing Intellectual Property in a Music Fruition Environment; Barate et al.; IEEE MultiMedia, vol. 23, iss. 2, pp. 84-94; Jun. 2016 (Year: 2016).*

Accessing Tape Music Documents on Mobile Devices; Canazza et al.; ACM Transactions on Multimedia Computing, Communications, and Applications (TOMM)—Special Issue on Smartphone-Based Interactive Technologies, Systems, and Applications, vol. 12., iss. 1s, article No. 20; Oct. 2015 (Year: 2015).*

* cited by examiner

OPTIMIZED READING OF MULTIPLE OBJECTS FROM TAPE

FIELD OF THE INVENTION

This invention relates to systems and methods for restoring multiple objects from tape.

BACKGROUND OF THE INVENTION

As data storage needs continue to increase at a rapid rate, magnetic tape continues to offer some significant advantages over other data storage technologies. At an average cost on the order of $0.01 per gigabyte, tape storage is typically the most affordable option for storing massive quantities of data. Recent technological advances have also increased the speed that data can be written to and/or retrieved from tape, with some tape drives having the ability to read and/or write data at speeds of over 1 terabyte per hour. Other advantages of magnetic tape include reduced energy costs associated with storing data, portability, greater reliability and longevity, and the ability to easily scale tape storage as storage needs increase. For the reasons provided above, tape storage often plays a significant role in an organization's data storage infrastructure.

Due to its sequential-access characteristics, tape storage operates most efficiently when streaming data. It typically does not perform as well when performing many small reads, where each read is separated by a head reposition operation. Attempting to read many small objects on the tape may cause many starts and stops of the tape head and result in significant I/O performance degradation. Unfortunately, this is often the kind of behavior that is observed when directly restoring objects from tape to another storage medium such as disk. In some cases, objects that need to be restored may not be adjacent to one another or the objects may be separated by free space formerly occupied by objects that have since been deleted. This may cause the start and stop behavior and resulting I/O performance degradation described above.

In view of the foregoing, what are needed are systems and methods to more efficiently read multiple objects from tape. Ideally, such systems and methods will minimize and/or reduce start and stop behavior and resulting I/O performance degradation when restoring multiple objects from tape.

SUMMARY

The invention has been developed in response to the present state of the art and, in particular, in response to the problems and needs in the art that have not yet been fully solved by currently available systems and methods. Accordingly, systems and methods are disclosed for restoring multiple objects from tape. The features and advantages of the invention will become more fully apparent from the following description and appended claims, or may be learned by practice of the invention as set forth hereinafter.

Consistent with the foregoing, a method for restoring multiple objects from tape is disclosed. In one embodiment, such a method (1) generates a list of objects to be restored from tape and (2) identifies a starting location of a first object on the tape. The method (3) reads, into a buffer from the tape, an entire buffer of data beginning from the starting location. The method then (4) determines a length of the first object. The method (5) restores the first object and (6) finds a start of a next object in the buffer using a length of the previous object in the buffer. The method (7) determines a length of the next object by analyzing metadata of the next object and (8) restores the next object if the next object is in the list. The method (9) repeats steps (6), (7), and (8) until the end of the buffer is reached or all objects in the list have been restored.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
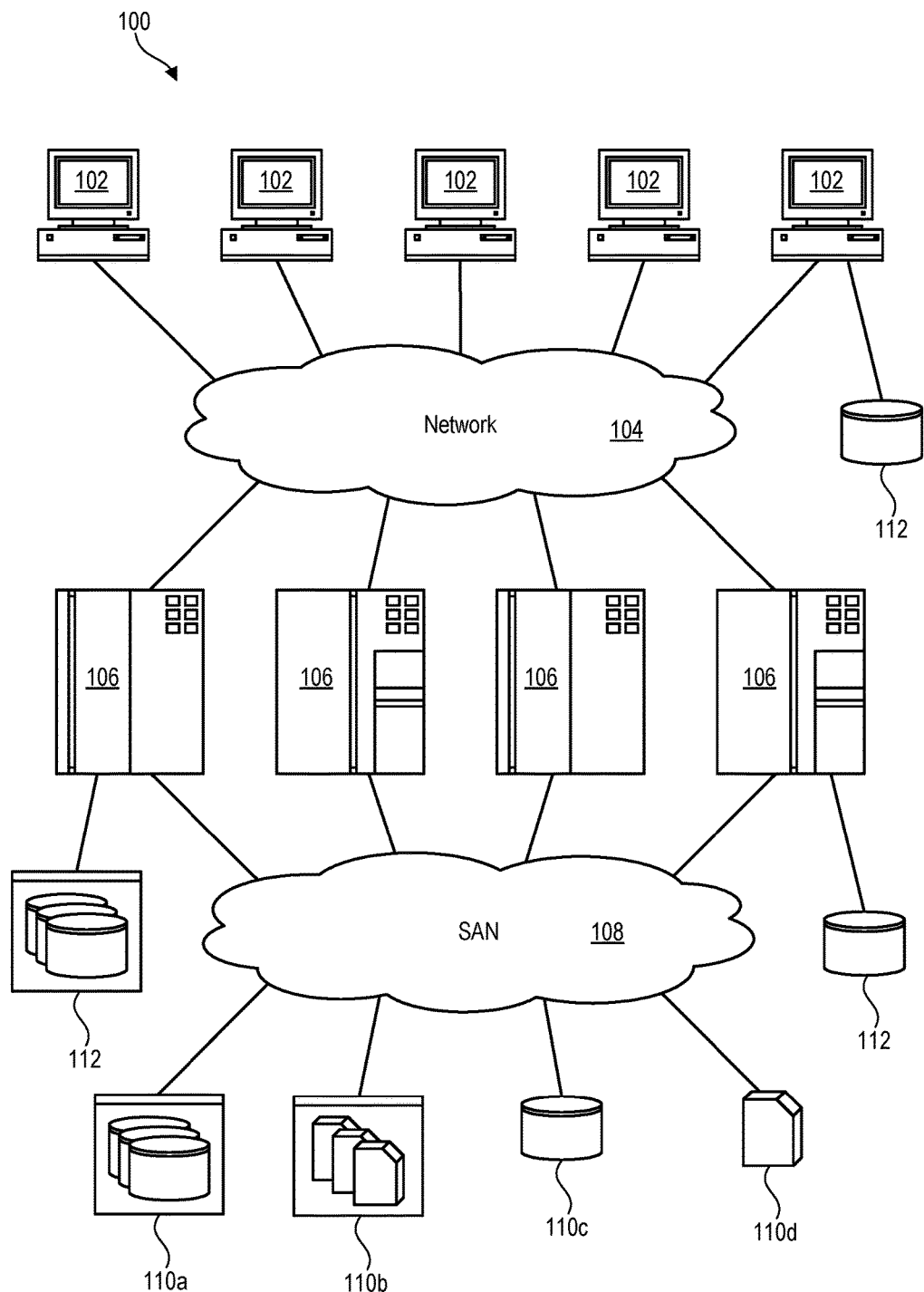
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
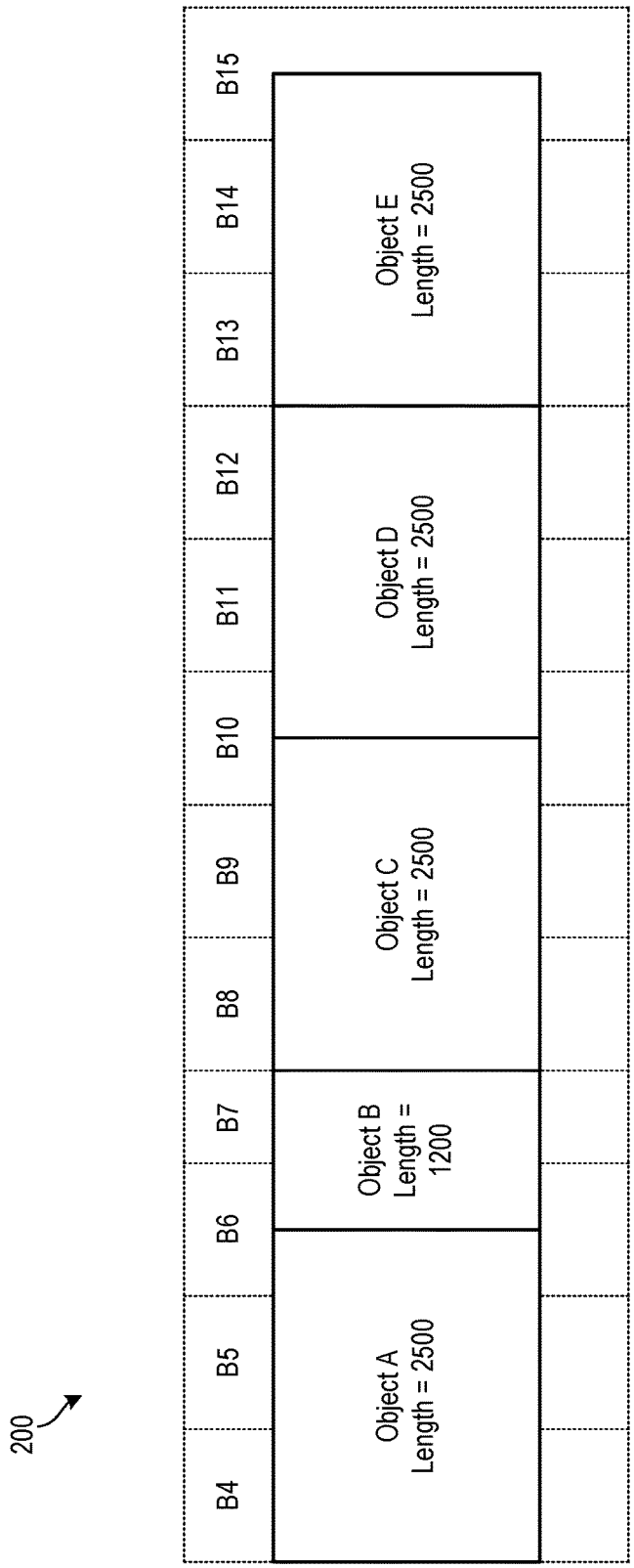
FIG. 2 is a high-level block diagram showing various objects residing on tape and distributed across variable-length blocks on the tape.

Referring to FIG. 2, as previously mentioned, due to its sequential-access characteristics, tape storage 110b, 110d operates most efficiently when streaming data. It typically does not perform as well when performing many small reads, where each read is separated by a head reposition operation. Attempting to read many small objects on tape may cause many starts and stops of the tape head and result in significant I/O performance degradation. Unfortunately, this is often the kind of behavior that is observed when directly restoring objects from tape to another storage medium such as disk. In some cases, objects that need to be restored may not be adjacent to one another or the objects may be separated by free space formerly occupied by objects that have since been deleted. This may cause the start and stop behavior and resulting I/O performance degradation described above.

In order to prevent the above-described start and stop behavior and resulting I/O performance degradation, systems and methods in accordance with the invention may sequentially read a relatively large amount data from tape into a buffer until it reaches full or substantially full capacity. This large amount of data will ideally contain multiple objects (e.g., files, etc.) that are desired to be restored. It may also contain some objects that are not to be restored. Once this data is loaded into the buffer, desired objects may be restored from the buffer (which may be implemented in faster, direct-access memory) instead of directly from tape. This will reduce or minimize starts and stops of a tape head when restoring objects from tape.

When restoring objects from a buffer instead of tape, problems may arise when dealing with variable-length blocks on the tape. When using variable-length blocks, the starting location of each object on tape is a function of both its starting block and starting offset within the block. However, when data is read from tape into a buffer, the notion of blocks may not be preserved and the starting location of any object beyond the first object in the buffer may be lost since each block may potentially have a different length when using variable-length formatting.

For example, consider a scenario where objects A, B, C, and D are stored on tape but only objects A, C, and D need to be restored. Further assume that object B still resides on the tape but is no longer being tracked because it has been deleted. Thus, a backup application may not be aware of object B, its size, nor how it translates into blocks written on tape and/or potentially the length of the blocks if smaller than a configured block size. The backup application only knows the starting location of objects A, C, and D in terms of blocks and offsets within the blocks. Thus, using the example provided above, the backup application may know that object C starts four blocks beyond the start of object A, but would have no idea what the size of any of the four blocks are. Once this data has been read into a buffer, the concept of blocks may be lost and all that may remain are simple byte offsets relative to the beginning of the buffer.

The alternative to variable-length formatting is fixed-length formatting, where every block that is written to tape is the same size. Smaller blocks are not allowed in fixed-length formatting. Even in cases where an application writes an amount of data that is smaller than a block, the tape drive will write out a full block. Fixed-length formatting makes it relatively simple to translate stored starting location information in terms of blocks and offsets within the blocks into a simple byte offset within a buffer. This is because an application will know the length of every block based on the fixed-length format and block size configured when first writing to tape. With variable-length formatting, however, the application does not know the length of every block, thereby making it difficult to determine the offset of each object in the buffer.

In order to locate objects in a buffer in environments using variable-length blocks, systems and methods in accordance with the invention may utilize metadata in each object to uniquely identify the object and determine its length. An application may already have length information for each object that it is aware of. However, the application may lack information about objects that were previously deleted but nevertheless still reside on tape. Deleted objects may persist through a life-cycle of a tape volume and storage space occupied by the deleted objects may not be reused as in other storage environments. Because deleted objects are still present on the tape, their metadata and associated length information may be accessed and utilized. This length information may be useful in locating and restoring other non-deleted objects from tape after they have been read into a buffer.

FIG. 2 shows an example of five objects A, B, C, D, and E, written to tape 200. The size of the objects is shown in bytes. As shown, the objects span twelve blocks (blocks B4 through B15) on tape. Assume that the blocks use a variable-length format and that each block is 1000 bytes with the exception of block B7, which is 700 bytes. Block B7 may be "short" block at the end of a backup operation, for example. Using these numbers and assuming the objects are adjacent to one another (a next object begins where the previous object ends), object A starts in block B4 at an offset of 0; object B starts in block 6 at an offset of 500; object C starts in block B8 at an offset of 0; object D starts in block 10 at an offset of 500; and object E starts in block 13 at an offset of 0. Further assume that object B has been deleted, such that object B still occupies storage space on the tape 200, but is not known to applications accessing the tape medium 200. Because object B has been deleted, applications will not know the size of blocks B6 and B7 in a variable-length environment (either or both blocks B6 and B7 could be short or full length blocks).

Figure 3:
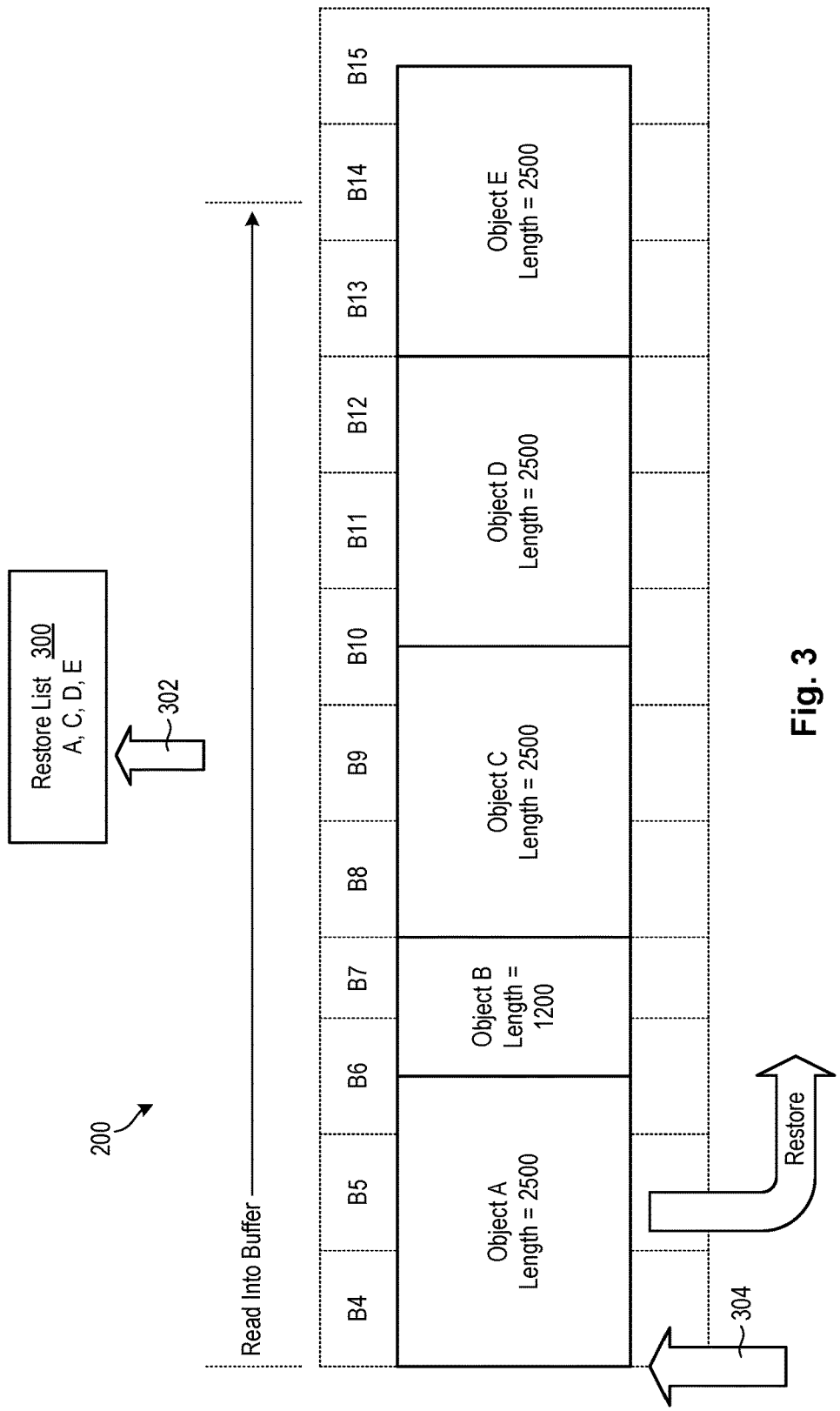
FIG. 3 is a high-level block diagram showing a restore list and restoration of a first object in the list.

Referring to FIG. 3, assume that an application wishes to restore blocks A, C, D, and E from the tape 200. To accomplish this, systems and methods in accordance with the invention may generate a list 300 of objects to be restored from tape. This list 300 may, in certain embodiments, be ordered in accordance with the objects' physical location on the tape 200. Using the technique described above, a full buffer of data may then be read into a buffer starting from the location of the first block in the restore list 300. Assume, for the purpose of this example, that the buffer is able to hold 10,000 bytes. This will allow blocks B4 through B13 to be fully read into the buffer, as well as part of block B14, as shown in FIG. 3. This, in turn will allow objects A, B, C, and D to be fully read into the buffer, as well as part of object E. Because object B has been deleted and the size of blocks B6 and B7 is unknown, the starting locations of blocks B8 through B14 in the buffer will also be unknown. As a result, the offsets of objects C, D, and E within the buffer will also be unknown.

Figure 4:
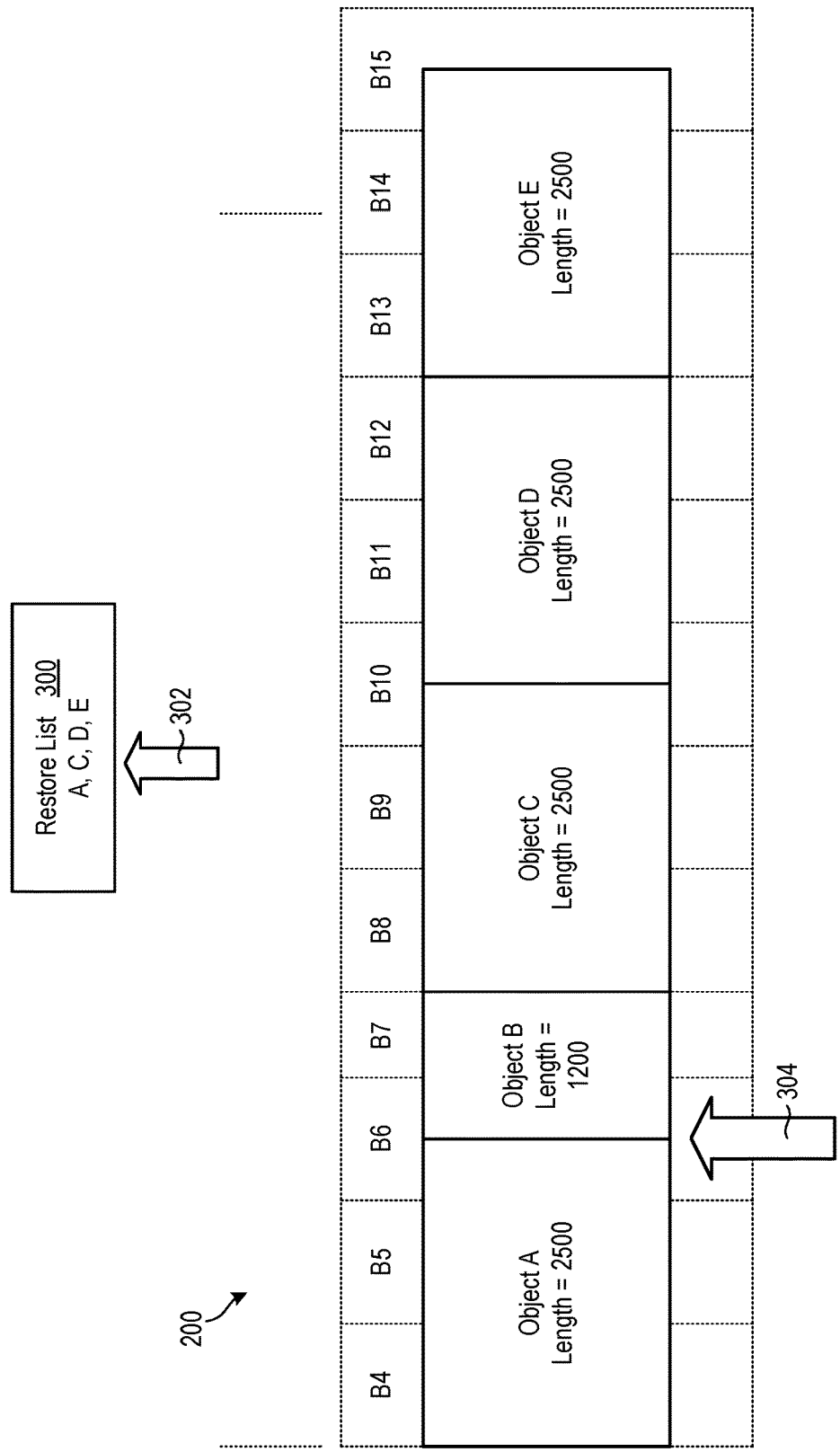
FIG. 4 is a high-level block diagram showing how to locate a next object in the buffer.

As previously mentioned, in order to locate objects in a buffer in a variable-length environment, systems and methods in accordance with the invention may utilize metadata in each object to uniquely identify the object and its length. This metadata may already be present in the objects or could be added to the objects ahead of time during write operations. In the example illustrated FIG. 3, systems and methods in accordance with the invention may analyze metadata at the beginning of object A to determine its length and identity. In certain embodiments, the object's identity may be determined from a unique signature such as an SHA1 hash in the metadata. Because object A is in the restore list 300, object A may be restored from the buffer to another storage medium such as disk. The buffer may then be traversed by the length of object A to find the beginning of object B, as shown in FIG. 4. The metadata of object B may then be read and analyzed to determine the length and identity of object B. Because object B is not in the restore list 300, object B may not be restored.

Figure 5:
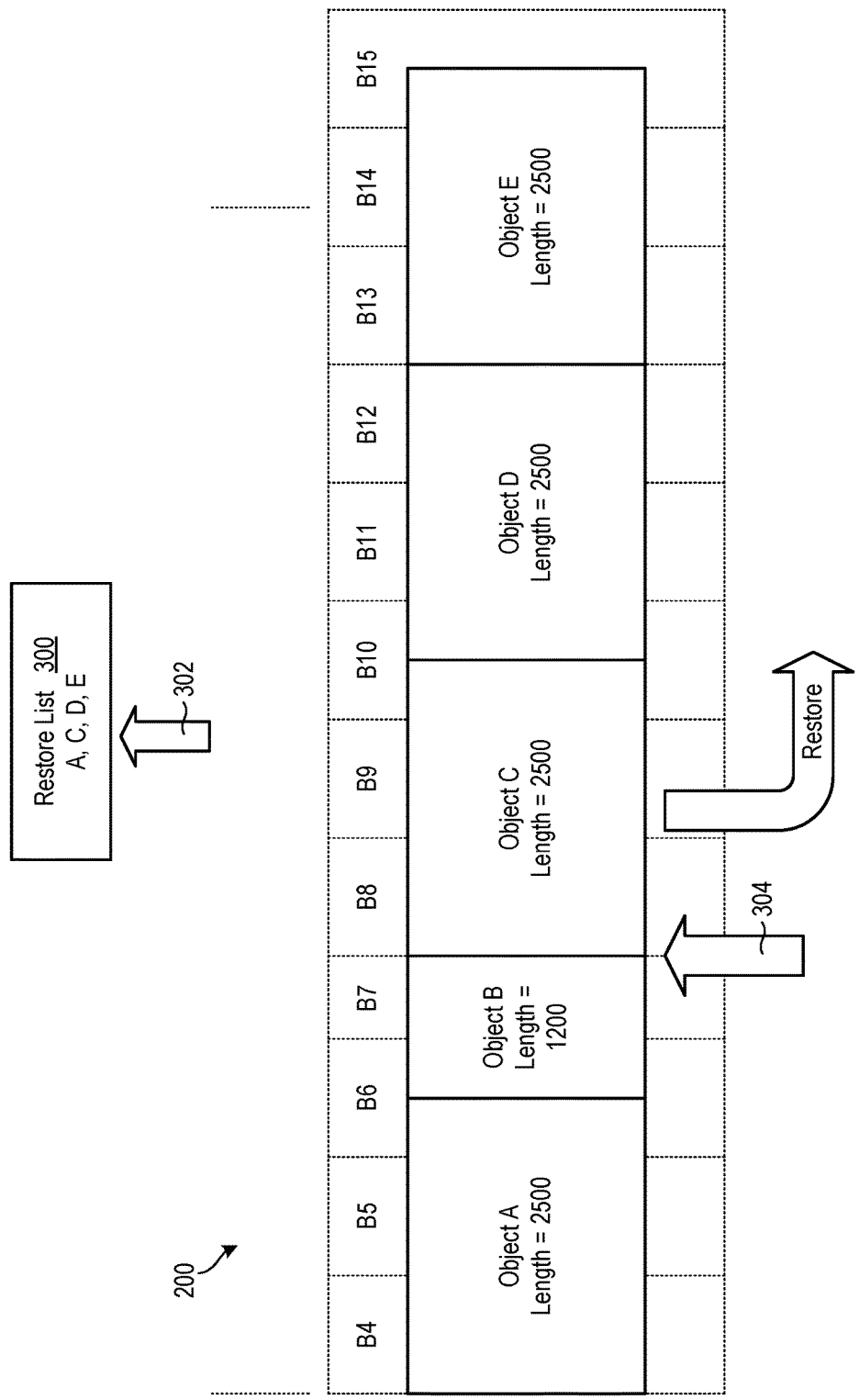
FIG. 5 is a high-level block diagram showing finding and restoration of a second object in the list.

The buffer may then be traversed by the length of object B to find the beginning of object C, as shown in FIG. 5. The metadata of object C may then be read and analyzed to determine the length and identity of object C. Because object C appears in the restore list 300, object C may be restored.

Figure 6:
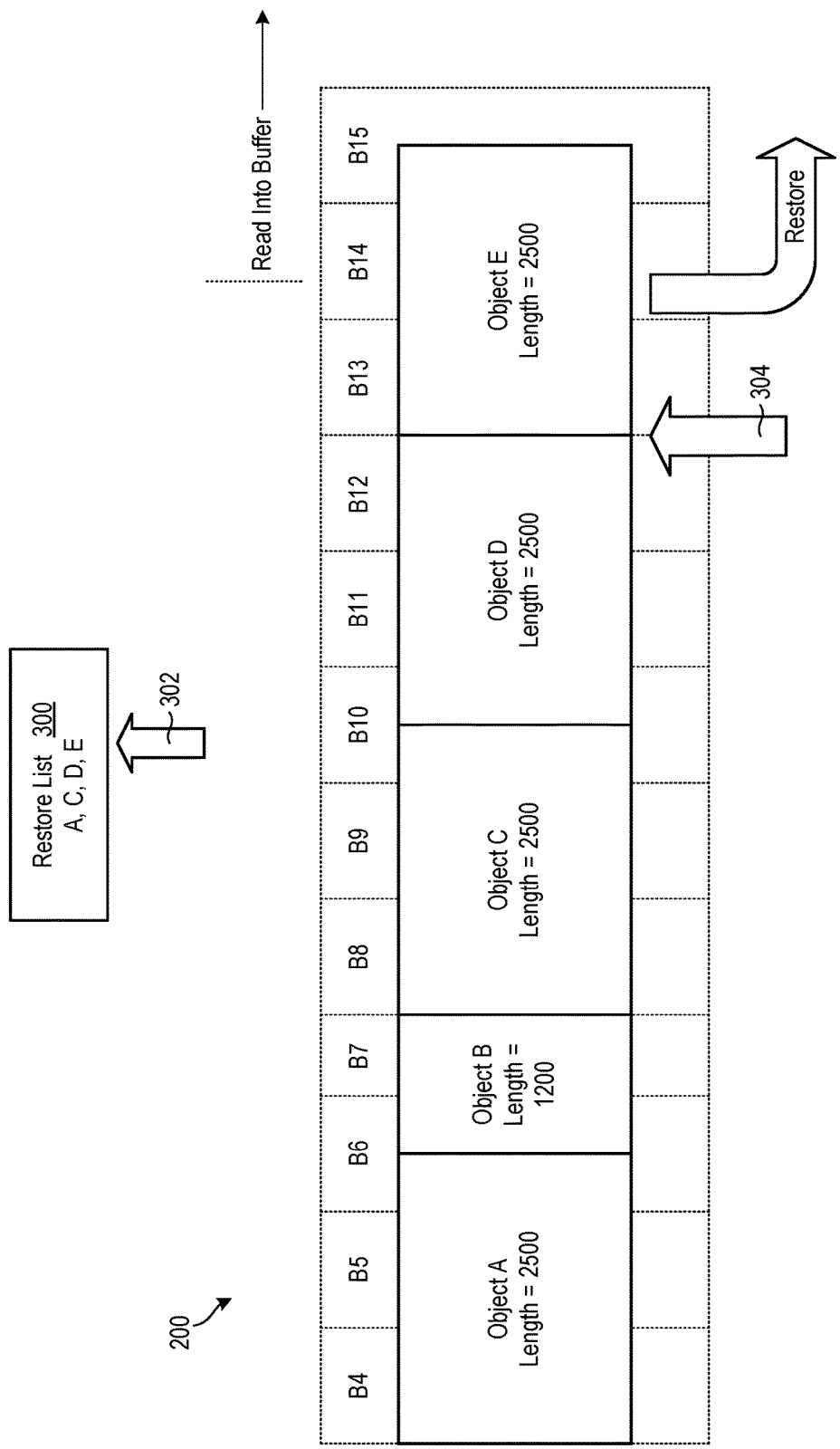
FIG. 6 is a high-level block diagram showing finding and restoration of a fourth object in the list by reading additional data into the buffer.

This process may continue until the beginning of object E is reached, as shown in FIG. 6. Like the previous objects, the metadata of object E may be read and analyzed to determine the length and identity of object E. Because object E appears in the restore list 300, object E may be restored. However, at least part of object E is not in the buffer. When the end of the buffer is reached, a new entire buffer of data may be read from tape into the buffer. In this example, the new buffer of data may start at the beginning of object E or at some location within object E, depending on how much of object E was already restored. This will allow the remaining portion of object E to be restored as well as additional objects if any are remaining in the restore list 300. This process may continue until all objects in the restore list 300 are restored.

Figure 7:
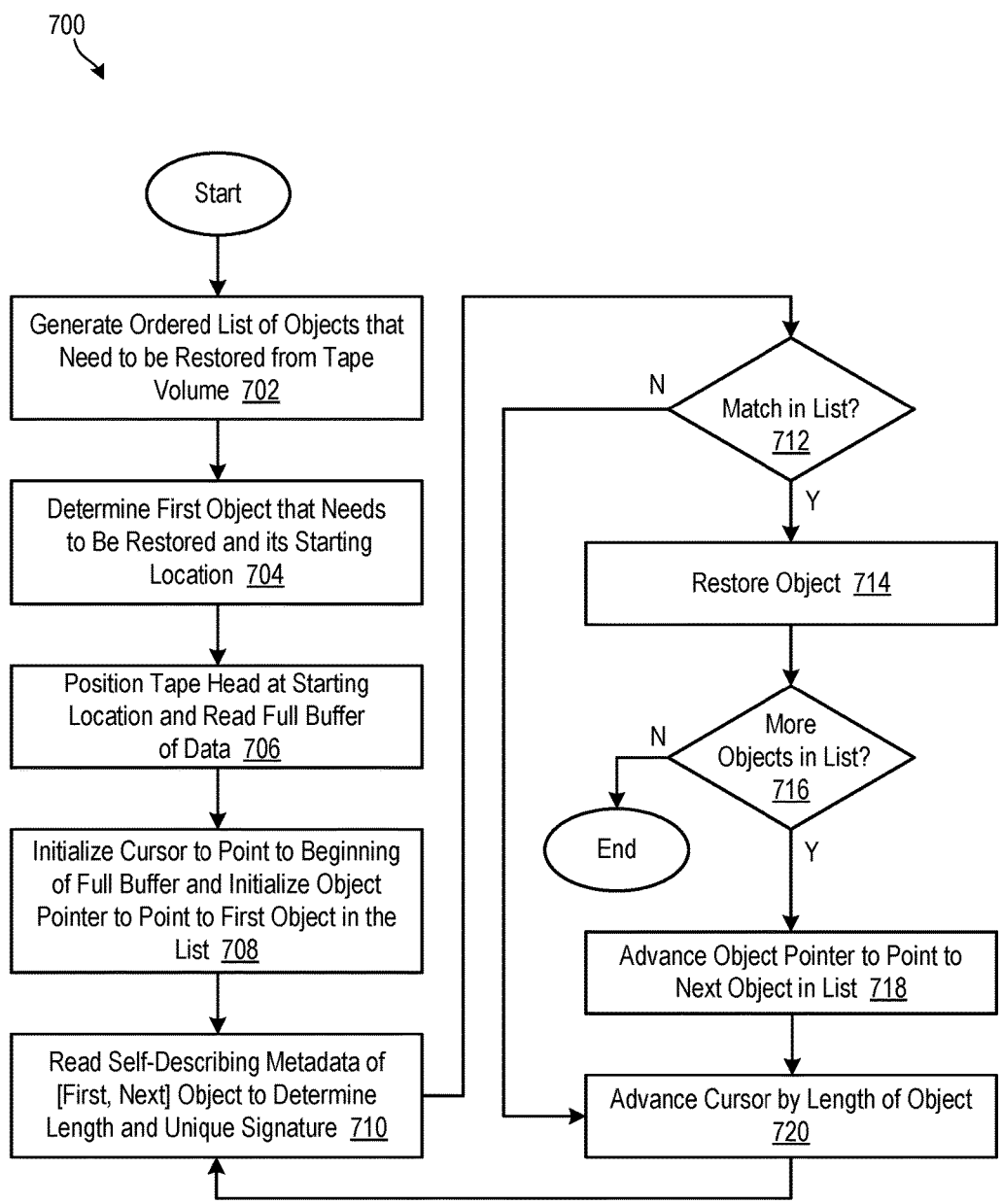
FIG. 7 is a process flow diagram showing a method for restoring multiple objects from tape.

Referring to FIG. 7, while continuing to refer generally to FIGS. 2 through 6, one embodiment of a method 700 for restoring multiple objects from tape 200 is illustrated. This method 700 is presented by way of example and may be modified where needed. As shown, the method 700 initially generates 702 an ordered list of objects that need to be restored from tape 200. The method 700 then determines 704 a first object in the list 300 that needs to be restored and its starting location on the tape 200. The method 700 positions 706 the tape head at the starting location and reads 706 a full buffer of data into a buffer. Once the buffer is filled, the method 700 initializes 708 a cursor 304 to point to the beginning of the buffer and initializes 708 an object pointer 302 to point to the first object in the restore list 300. The method 700 then reads 710 self-describing metadata of the first object to determine the object's length and unique signature.

If, at step 712, the unique signature of the object matches the current object being pointed to in the restore list 300, the method 700 restores 714 the object. The method 700 then determines 716 if there are more objects in the restore list 300 that need to be restored. If not, the method 700 ends. If the restore list 300 contains more objects, the method 700 advances 718 the object pointer 302 to point to the next object in the restore list 300 and advances 720 the cursor 304 by the length of the current object so that it points to the next object in the buffer. The method 700 then repeats steps 710, 712, 714, 716, 718, 720, until all objects in the restore list 300 have been restored.

If, at step 712, the unique signature does not match the current object in the list 300, the method 700 simply advances 720 the cursor 304 by the length of the current object so that it points to the next object in the buffer. The method 700 then repeats steps 710, 712, 714, 716, 718, 720, until all objects in the restore list 300 have been restored.

If, during processing of the method 700, the end of the buffer is reached and all objects in the restore list 300 have not been fully restored, a new buffer of data may be read into the buffer (starting from the next object in the restore list 300 that needs to be restored) and the method 700 may continue in the same manner discussed above. If an object was partially restored, this may be the first object read into the buffer. This may occur until all objects have been restored or until the end of the tape 200 is reached, in which case the method 700 may potentially end without restoring all objects in the restore list 300.

The method 700 may be modified as needed. For example, instead of providing an ordered list 300 of objects to restore, the restore list 300 may be substantially unordered or not require ordering. The restore list 300 may be searched for the first object that appears on the tape 200 so that a full buffer of data may be loaded into the buffer. Each time an object is encountered in the buffer, the restore list 300 may be searched to determine if the object is listed therein. If so, the object may be restored and the object checked off in the restore list 300. If not, the method may move to the next object in the buffer (by referencing the object metadata) and compare this object to those listed in the restore list 300. This process may continue until all objects in the restore list 300 are restored and checked off, or until all objects on the tape 200 have been examined. This variation of the method 700 may reduce the chance that certain desired objects in the buffer are skipped over if for some reason the object pointer 302 is pointing to a different object when a desired object is encountered, or objects in the restore list 300 are not ordered correctly. If a desired object is accidentally skipped over without being restored, the method 700 could potentially proceed to the end of the tape 200 without restoring the desired object.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for restoring multiple objects from tape, the method comprising:
   (1) generating a list of objects to be restored from tape;
   (2) identifying a starting location of a first object on the tape and in the list;
   (3) reading, into a buffer from the tape, an entire buffer of data beginning from the starting location;
   (4) determining a length of the first object by analyzing metadata of the first object in the buffer;
   (5) restoring the first object;

(6) finding a start of a next object in the buffer by extracting, from metadata in the buffer associated with a previous object in the buffer, a length of the previous object in the buffer;
(7) determining a length of the next object by analyzing metadata of the next object;
(8) restoring the next object if the next object is in the list; and
(9) repeating steps (6), (7), and (8) until the end of the buffer is reached or all objects in the list have been restored.

2. The method of claim 1, wherein the list of objects is ordered in accordance with the objects' physical location on the tape.

3. The method of claim 1, further comprising reading another entire buffer of data into the buffer in the event the end of the buffer is reached and not all objects in the list have been restored.

4. The method of claim 1, further comprising using the metadata of an object to identify the object.

5. The method of claim 1, further comprising using the metadata of an object to determine a unique signature associated with the object.

6. The method of claim 1, wherein the objects are distributed across a plurality of variable-length-formatted blocks on the tape.

7. The method of claim 6, wherein reading an entire buffer of data into the buffer comprises reading a plurality of variable-length-formatted blocks into the buffer.

8. A computer program product for restoring multiple objects from tape, the computer program product comprising a computer-readable storage medium having computer-usable program code embodied therein, the computer-usable program code configured to perform the following when executed by at least one processor:
(1) generate a list of objects to be restored from tape;
(2) identify a starting location of a first object on the tape and in the list;
(3) read, into a buffer from the tape, an entire buffer of data beginning from the starting location;
(4) determine a length of the first object;
(5) restore the first object;
(6) find a start of a next object in the buffer by extracting, from metadata in the buffer associated with a previous object in the buffer, a length of the previous object in the buffer;
(7) determine a length of the next object by analyzing metadata of the next object;
(8) restore the next object if the next object is in the list; and
(9) repeat steps (6), (7), and (8) until the end of the buffer is reached or all objects in the list have been restored.

9. The computer program product of claim 8, wherein the list of objects is ordered in accordance with the objects' physical location on the tape.

10. The computer program product of claim 8, wherein the computer-usable program code is further configured to read another entire buffer of data into the buffer in the event the end of the buffer is reached and not all objects in the list have been restored.

11. The computer program product of claim 8, wherein the computer-usable program code is further configured to use the metadata of an object to identify the object.

12. The computer program product of claim 8, wherein the computer-usable program code is further configured to use the metadata of an object to determine a unique signature associated with the object.

13. The computer program product of claim 8, wherein the objects are distributed across a plurality of variable-length-formatted blocks on the tape.

14. The computer program product of claim 13, wherein reading an entire buffer of data into the buffer comprises reading a plurality of variable-length-formatted blocks into the buffer.

15. A system for restoring multiple objects from tape, the system comprising:
at least one processor;
at least one memory device operably coupled to the at least one processor and storing instructions for execution on the at least one processor, the instructions causing the at least one processor to:
(1) generate a list of objects to be restored from tape;
(2) identify a starting location of a first object on the tape and in the list;
(3) read, into a buffer from the tape, an entire buffer of data beginning from the starting location;
(4) determine a length of the first object;
(5) restore the first object;
(6) find a start of a next object in the buffer by extracting, from metadata in the buffer associated with a previous object in the buffer, a length of the previous object in the buffer;
(7) determine a length of the next object by analyzing metadata of the next object;
(8) restore the next object if the next object is in the list; and
(9) repeat steps (6), (7), and (8) until the end of the buffer is reached or all objects in the list have been restored.

16. The system of claim 15, wherein the list of objects is ordered in accordance with the objects' physical location on the tape.

17. The system of claim 15, wherein the instructions further cause the at least one processor to read another entire buffer of data into the buffer in the event the end of the buffer is reached and not all objects in the list have been restored.

18. The system of claim 15, wherein the instructions further cause the at least one processor to use the metadata of an object to identify the object.

19. The system of claim 15, wherein the objects are distributed across a plurality of variable-length-formatted blocks on the tape.

20. The system of claim 19, wherein reading an entire buffer of data into the buffer comprises reading a plurality of variable-length-formatted blocks into the buffer.

* * * * *